Figure 1:
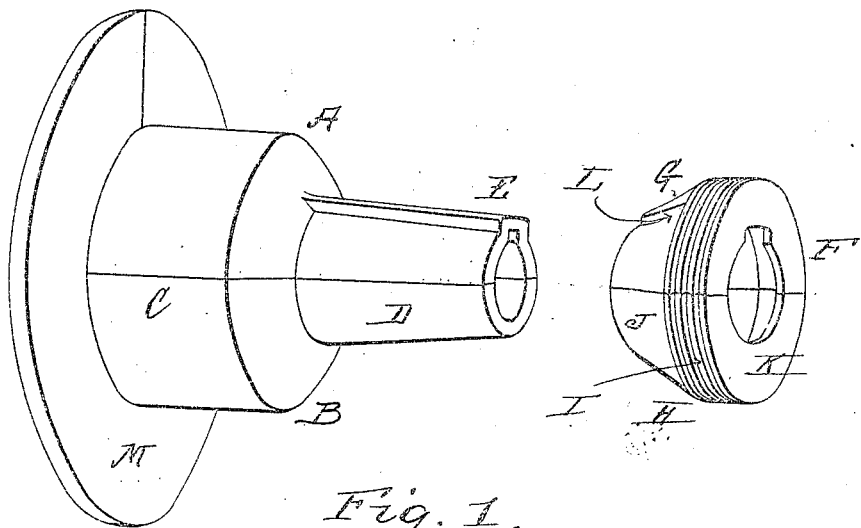

T. E. MURRAY.
SHEET METAL HUB.
APPLICATION FILED JAN. 10, 1917.

1,230,427.

Patented June 19, 1917.

Inventor
Thomas E. Murray
By his Attorney

UNITED STATES PATENT OFFICE.

THOMAS E. MURRAY, OF NEW YORK, N. Y.

SHEET-METAL HUB.

1,230,427. Specification of Letters Patent. Patented June 19, 1917.

Application filed January 10, 1917. Serial No. 141,545.

*To all whom it may concern:*

Be it known that I, THOMAS E. MURRAY, a citizen of the United States, residing at New York, in the county of New York and State of New York, have invented a certain new and useful Improvement in Sheet-Metal Hubs, of which the following is a specification.

The invention is a sheet metal hub for vehicle- and especially automobile-wheels. Hitherto, sheet metal hubs have been drawn in tubular form from the metal sheets, a proceeding which involves several readjustments of the work in the drawing press, with consequent loss of time. By my present invention, the hub is formed of sections pressed, struck up or stamped from sheet metal and united by electrical welding. The resulting structure is amply strong and light, and is made with a large reduction of expense.

In the accompanying drawings—

Figures 2, 3:
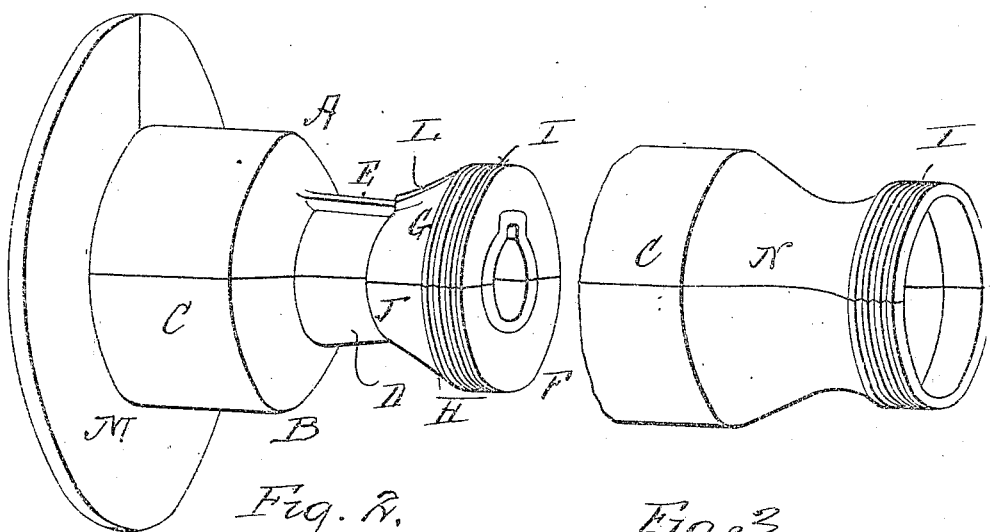

Figure 1 is a perspective view of my hub and of the cap-receiving sleeve. Fig. 2 shows the parts severally shown in Fig. 1 united. Fig. 3 is a perspective view of a modified form of my hub in which the tubular body portion and cap-receiving sleeve are made integral.

Similar letters of reference indicate like parts.

The hub is formed in two longitudinally divided half sections A, B, stamped, pressed or struck up from sheet metal and electrically welded together at their meeting edges. It comprises a tube C and integral therewith a tube D of less diameter and outwardly contracted or tapering. On one-half section, as A, and extending along tube D is a hollow rib E forming the keyway for the usual key which connects the axle to the hub.

F is a sleeve, also made in two longitudinally divided sections G, H, and comprises a cylindrical threaded portion I and a rearwardly tapered portion J. Said sleeve has a front wall K, in which there is an opening corresponding in shape to the extremity of tube D, so that when said sleeve is placed upon said tube, as shown in Fig. 2, said extremity will be flush with the face of wall K. On said tapered portion J is a hollow rib L. The taper of portion J is to be such that when the extremity of tube D comes flush with wall K, said portion J will fit tightly upon tube D, the rib L then receiving the end of rib E.

In assembling the parts, the half sections A, B are electrically welded together. The sections G, H are similarly welded together. The sleeve F is placed upon the tube D, as described. To the rear edge of the united sections A, B may be electrically welded the flat ring M forming the hub flange.

As above described, the hub is adapted for use with the rear axle of an automobile. Where it is to be used for a front axle, it may be shaped, as shown in Fig. 3, with the threaded cap sleeve I integrally formed with a contracted portion N integral with tube C.

I claim:

1. A tubular hub of sheet metal formed of two longitudinally divided half sections homogeneously united at their registering edges and comprising a tube, a contracted tube in front thereof, and an externally threaded sleeve secured at the outer end of said contracted tube.

2. A tubular hub of sheet metal formed of two longitudinally divided half sections homogeneously united at their registering edges and comprising a rear tube, a contracted tube in front thereof, and a threaded sleeve separately formed and receiving said contracted tube.

3. A tubular hub of sheet metal formed of two longitudinally divided half sections homogeneously united at their registering edges and comprising a tube, a contracted tube in front thereof, and a threaded sleeve also formed in two longitudinally divided half sections electrically welded together and receiving said contracted tube.

4. A tubular hub of sheet metal formed of two longitudinally divided half sections homogeneously united at their registering edges and comprising a tube, a contracted outwardly tapered tube in front thereof, a hollow longitudinal rib on said last-named tube, a threaded sleeve, a wall at the outer end of said sleeve, and, in said wall, an opening receiving the end of said outwardly tapered contracted tube.

5. A tubular hub of sheet metal formed of two longitudinally divided half sections homogeneously united at their registering edges and comprising a tube, a contracted outwardly tapered tube in front thereof, a hollow longitudinal rib on said last-named tube, a threaded cylindrical sleeve having an integral tapered extension fitting on said contracted tube, and a front wall at its outer end having an opening receiving and closed by the extremity of said contracted tube.

In testimony whereof I have affixed my signature in presence of two witnesses.

THOMAS E. MURRAY.

Witnesses:
GERTRUDE T. PORTER,
MAY T. McGARRY.